(12) United States Patent
Song

(10) Patent No.: US 9,217,411 B2
(45) Date of Patent: Dec. 22, 2015

(54) ROTATIONAL FORCE GENERATING DEVICE AND A CENTRIPETALLY ACTING TYPE OF WATER TURBINE USING THE SAME

(76) Inventor: Kil Bong Song, Seoul (KR)

( * ) Notice: Subject to any disclaimer, the term of this patent is extended or adjusted under 35 U.S.C. 154(b) by 730 days.

(21) Appl. No.: 13/580,081

(22) PCT Filed: Feb. 16, 2011

(86) PCT No.: PCT/KR2011/001018
§ 371 (c)(1),
(2), (4) Date: Aug. 20, 2012

(87) PCT Pub. No.: WO2011/102638
PCT Pub. Date: Aug. 25, 2011

(65) Prior Publication Data
US 2012/0313375 A1  Dec. 13, 2012

(30) Foreign Application Priority Data
Feb. 19, 2010  (KR) ........................ 10-2010-0014952

(51) Int. Cl.
*F03B 3/02*  (2006.01)
(52) U.S. Cl.
CPC . *F03B 3/02* (2013.01); *Y02E 10/223* (2013.01)
(58) Field of Classification Search
CPC ............ F03B 3/02; F03B 15/02; F03B 17/02; F03B 17/062; F05B 2250/231; F05B 2250/232; Y02E 10/223; Y02E 10/226
See application file for complete search history.

(56) References Cited

U.S. PATENT DOCUMENTS

| | | | | |
|---|---|---|---|---|
| 2,577 A | * | 4/1842 | Blake | 241/261.1 |
| 2,599 A | * | 4/1842 | Howd | 415/188 |
| 2,622 A | * | 5/1842 | Woodard | 415/205 |
| 2,989 A | * | 3/1843 | Wells | 415/205 |
| 24,055 A | * | 5/1859 | Richardson | 415/141 |
| 24,497 A | * | 6/1859 | Smith | 415/166 |
| 34,150 A | * | 1/1862 | Jeffel | 415/164 |
| 35,233 A | * | 5/1862 | Harnish | 415/205 |
| 69,294 A | * | 9/1867 | Wynkoon | 415/69 |
| 191,668 A | * | 6/1877 | Good | 415/69 |

(Continued)

FOREIGN PATENT DOCUMENTS

| | | |
|---|---|---|
| KR | 10-2009-0075298 A | 7/2009 |
| WO | 97/21035 A1 | 6/1997 |
| WO | 2008/018087 A1 | 2/2008 |

OTHER PUBLICATIONS

International Search Report of International Application No. PCT/KR2011/001018, dated Sep. 28, 2011.

*Primary Examiner* — Craig Kim
*Assistant Examiner* — Wayne A Lambert
(74) *Attorney, Agent, or Firm* — Revolution IP, PLLC

(57) ABSTRACT

The present invention relates to a centripetally acting type of water turbine which uses low-head and low-speed water flow and which comprises a rotational force generating device having an inner and an outer centripetal canister rotatably supported by means of a stand and a securing shaft either vertically or to left and right in a straight line, and having a plurality of blades fixedly joined in a radiating fashion between the inner and outer centripetal canisters, and in which the combined shape of the inner and outer centripetal canisters and neighboring individual blades is constituted as a lower surface which inclines such that water or steam flows at an incline downwardly and, as it does so, the rotational radius progressively reduces.

8 Claims, 7 Drawing Sheets

(56) References Cited

U.S. PATENT DOCUMENTS

| | | | | |
|---|---|---|---|---|
| 207,076 A * | 8/1878 | Sheffer | | 415/164 |
| 239,649 A * | 4/1881 | Cline | | 415/191 |
| 469,306 A * | 2/1892 | Sands | | 415/117 |
| 533,004 A * | 1/1895 | Doolitle | | 415/38 |
| 1,294,050 A * | 2/1919 | Chute | | 415/224 |
| 2,735,647 A * | 2/1956 | Duport | | 415/180 |
| 3,586,867 A * | 6/1971 | Maillet | | 290/52 |
| 3,589,840 A * | 6/1971 | Murphy | | 417/406 |
| 4,035,658 A * | 7/1977 | Diggs | | 290/55 |
| 4,134,708 A * | 1/1979 | Brauser et al. | | 415/30 |
| 4,345,875 A * | 8/1982 | Charpentier | | 415/69 |
| 5,263,814 A * | 11/1993 | Jang | | 415/63 |
| 5,921,745 A * | 7/1999 | Round et al. | | 415/4.2 |
| 7,982,329 B2 * | 7/2011 | Lin et al. | | 290/55 |
| 2009/0311102 A1 | 12/2009 | Poll | | |

* cited by examiner

ROTATIONAL FORCE GENERATING DEVICE AND A CENTRIPETALLY ACTING TYPE OF WATER TURBINE USING THE SAME

TECHNICAL FIELD

The present invention relates to a centripetally acting type water turbine which uses low-head and low-speed water flow, and more particularly to a centripetally acting type water turbine which is configured to improve a gravity effect for a water turbine rotated while using a hydraulic pressure and rotational inertia of water.

BACKGROUND ART

In general, a water turbine for low-head uses a well-known water turbine, such as a waterwheel type water turbine. However, such a well-known water turbine has a limit in that its efficiency is low.

In addition, the water turbine has a configuration similar to that of a conventional centrifugal pump. The conventional centrifugal pump has a feature to be discussed below.

Korean Patent Registration No. 10-0381466-000 (Apr. 10, 2003) discloses a centrifugal or mixed flow turbo machine, which improves a blade angle to maximize the discharge pressure of a pump by a rotational force. However, there is a problem in that the improvement of blade angle is applicable only to a centrifugal pump but not applicable to a water turbine.

DETAILED DESCRIPTION OF THE INVENTION

Technical Problem

The present invention has been made in order to solve the above-mentioned problems, and an aspect of the present invention is to make it possible to rotationally operate a centripetally acting type water turbine continuously by using a hydraulic pressure and rotational inertia of water supplied from a waterway.

Another aspect of the present invention is to make it possible to obtain a desired rotational force at a desired place by rotating a rotationally operating blade, an inner centripetal canister and an outer centripetal canister individually or in unison.

Technical Solution

In order to solve the technical problem, in accordance with an aspect of the present invention, there is provided a rotational force generating device including: inner and outer centripetal canisters that are rotatably supported by means of a stand and a fixed shaft vertically or horizontally on a straight line; and a plurality of blades that are fixed radially between the inner and outer centripetal canisters. The combined shape of the inner and outer centripetal canisters and each pair of the adjacent blades provides a lower slope which makes water or steam flow downward inclinedly such that the rotational radius of the water or steam is gradually reduced. Accordingly, the inner and outer centripetal canisters enclosing the blades are rotated using the fixed shaft as a rotation support shaft by the impact of a medium, which includes water or steam, falling from a medium falling mechanism positioned above the rotary frames. Consequently, torques are induced by the lengths of the radius of rotation extending through the top side of the blades and the radius of rotation extending through the bottom side of the blades. As a result, the inner and outer centripetal canisters can be made to be continuously rotated due to the difference of torques, which is caused by the variation of the radius of rotation of the medium for power transmission caused by the change of velocity of the medium due to the rotation of the medium and the falling of the medium. As such, the inner and outer centripetal canisters are made to be rotated.

In accordance with another aspect of the present invention, there is provided a centripetally acting type water turbine using the above-mentioned rotational force generating device and configured to be rotationally operated by using water supplied from a waterway. The water turbine includes: a hollow fixing unit in which a fixed shaft is fixedly vertically to a fixed plate fixed to an installation place; a lateral-pressure bearing that is fitted on the lower part of the fixed shaft of the fixing unit; a lower rotary frame that is mounted on the lower part of the fixed shaft to partially enclose the upper part of the lateral-pressure bearing, the lower rotary frame being provided with one or more bearings for rotational operation within the inside thereof, and being formed with a plurality of discharge holes in the top side thereof at a predetermined interval to be capable of discharging inflow water to a water drainage channel; an upper rotary frame that is mounted on the upper part of the fixed shaft to be spaced from the lower rotary frame, the upper rotary frame being provided with a plurality of bearings for rotational operation; a cylindrical external centripetal canister that is mounted on the lower rotary frame, the lower part of the external centripetal canister being formed with a slope such that water can easily flow into the lower rotary frame, and a plurality of discharge passages being formed around the lower end; a cylindrical internal centripetal canister fixed to the outer periphery of an upper cover mounted on the bottom side of the upper rotary frame; and a plurality of blades that are mounted radially between the outer centripetal canister and inner centripetal canisters.

Advantageous Effects

In accordance with the present invention, a centripetally acting type water turbine can be continuously rotated using the hydraulic pressure and rotational inertia of water supplied from a waterway. Furthermore, the head of water, which is the potential energy of the water, can be entirely converted into a rotational force. As a result, the efficiency of the centripetally acting type water turbine can be improved.

In addition, the blades, the inner centripetal canister, and the outer centripetal canister, which are rotationally operated, can be rotated either individually or in unison. As such, it is possible to obtain a desired rotational force at a desired place.

Furthermore, it is possible to increase the kinetic energy of water while increasing the rotational force through a space formed between each pair of adjacent blades.

Moreover, by improving the operating characteristics of a water turbine in electric generation using a low flow velocity, the present invention allows the kinetic energy of water to be fully utilized as well as enables small hydro electric generation to be used in an area where water flows variously, thereby making it possible to complete a centripetally acting type water turbine for micro hydro electric generation that can contribute to the generation of environment-friendly energy.

MODE FOR CARRYING OUT THE INVENTION

Figure 1:
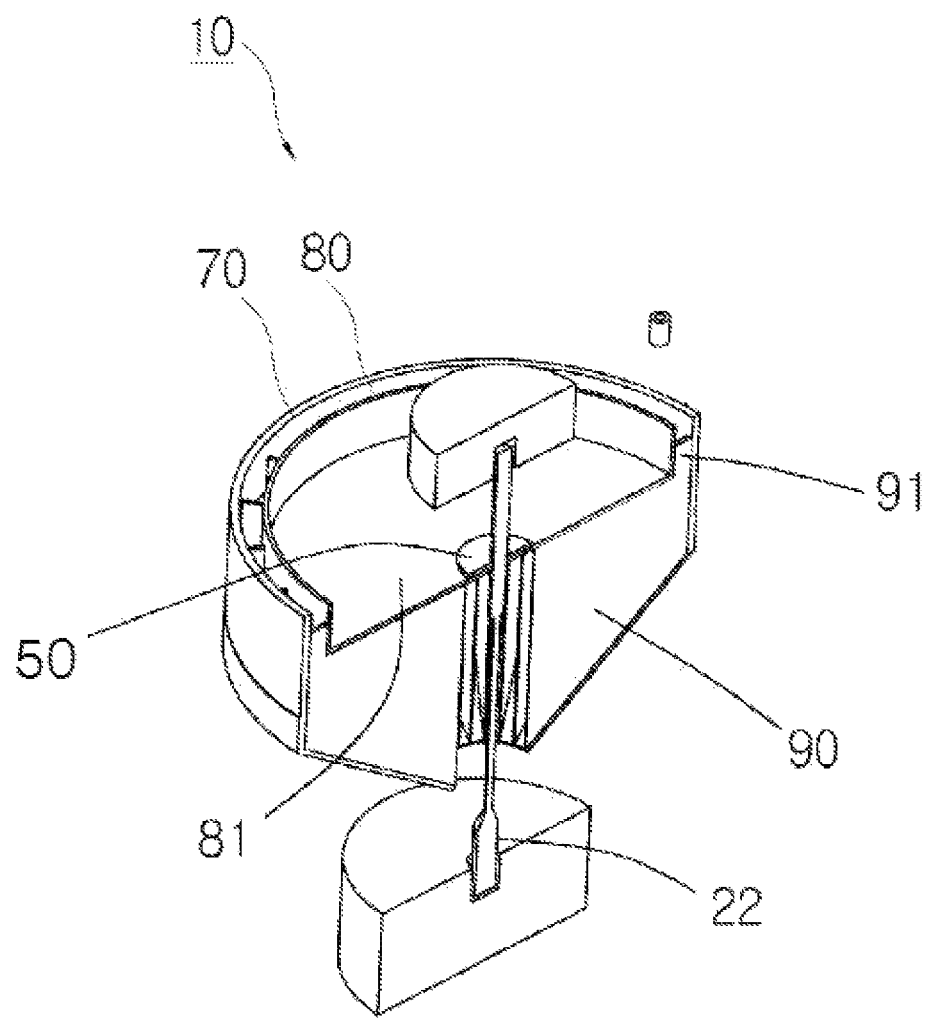
FIG. 1 is a half-sectioned perspective view illustrating a rotational force generating device in accordance with an exemplary embodiment of the present invention.
Figure 2:
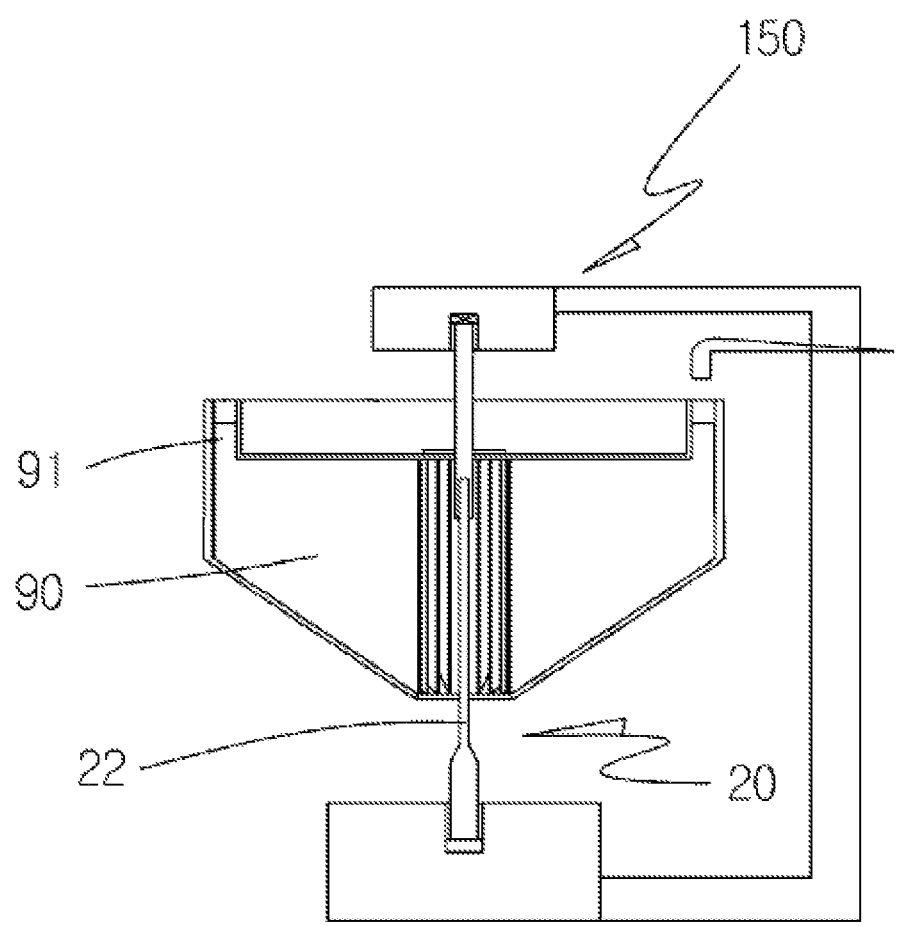
FIG. 2 is a front view of the rotational force generating device exemplified in FIG. 1.
Figure 3:
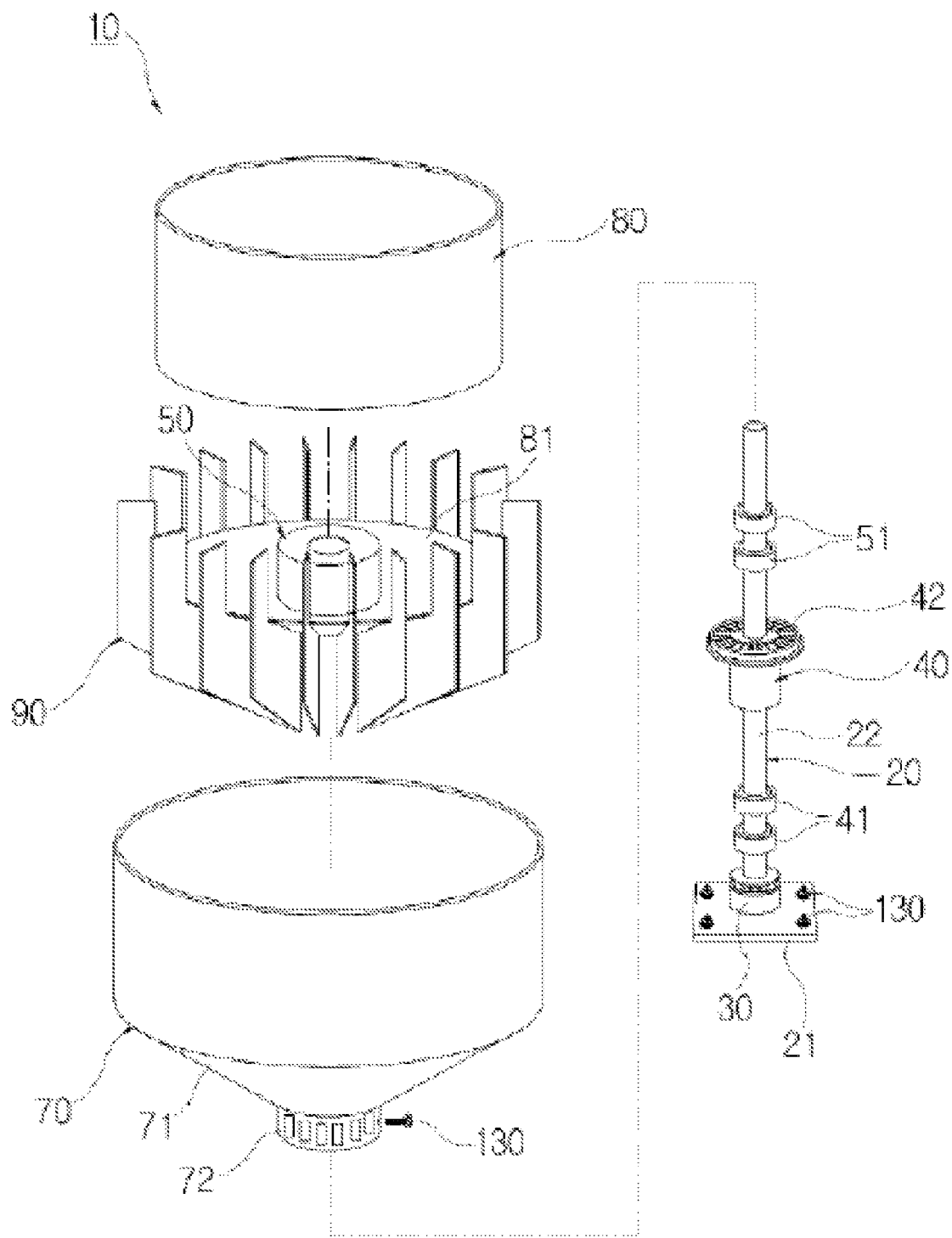
FIG. 3 is an exploded perspective view illustrating a centripetally acting type water turbine employing the inventive rotational force generating device.
Figure 4:
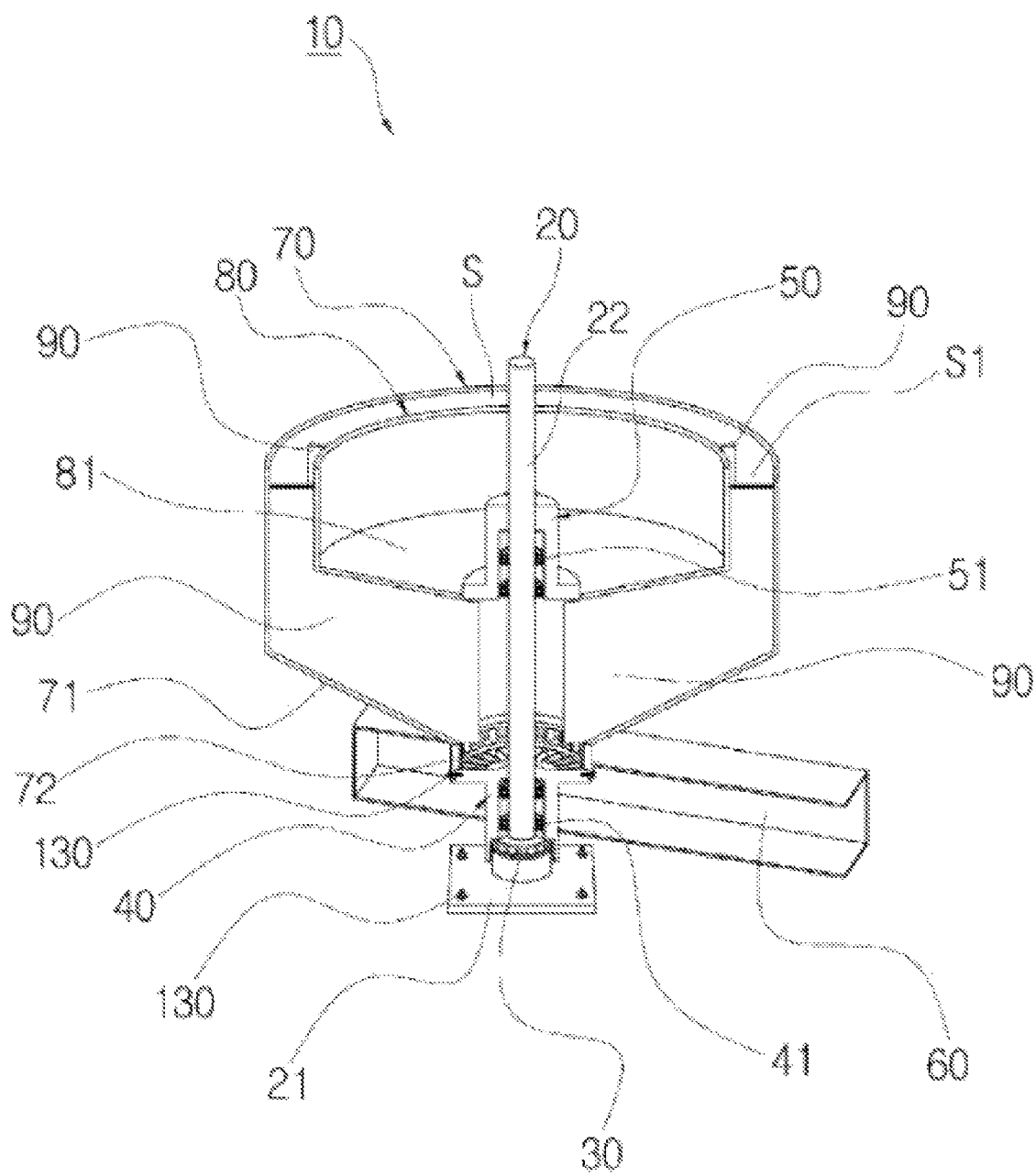
FIG. 4 is a perspective view illustrating partially in cross-section the internal construction of the inventive centripetally acting type water turbine.
Figure 5:
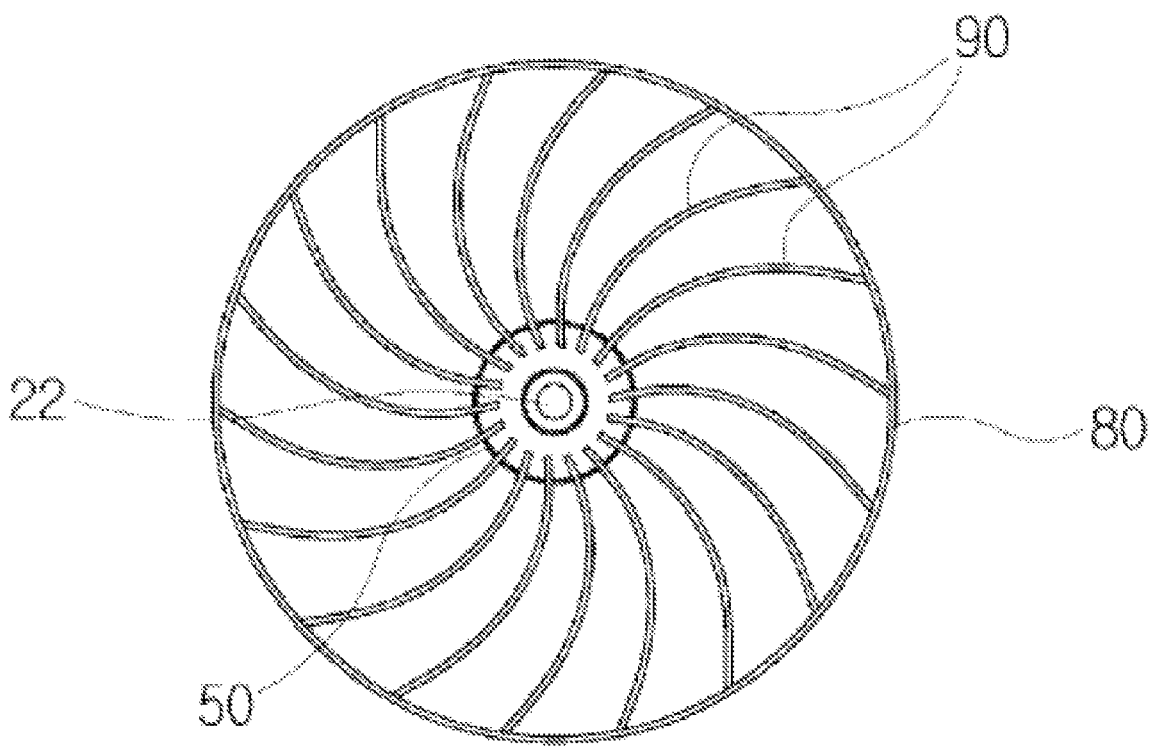
FIG. 5 is a top plan view illustrating another exemplary embodiment of the blades of the inventive centripetally acting type water turbine.
Figure 6:
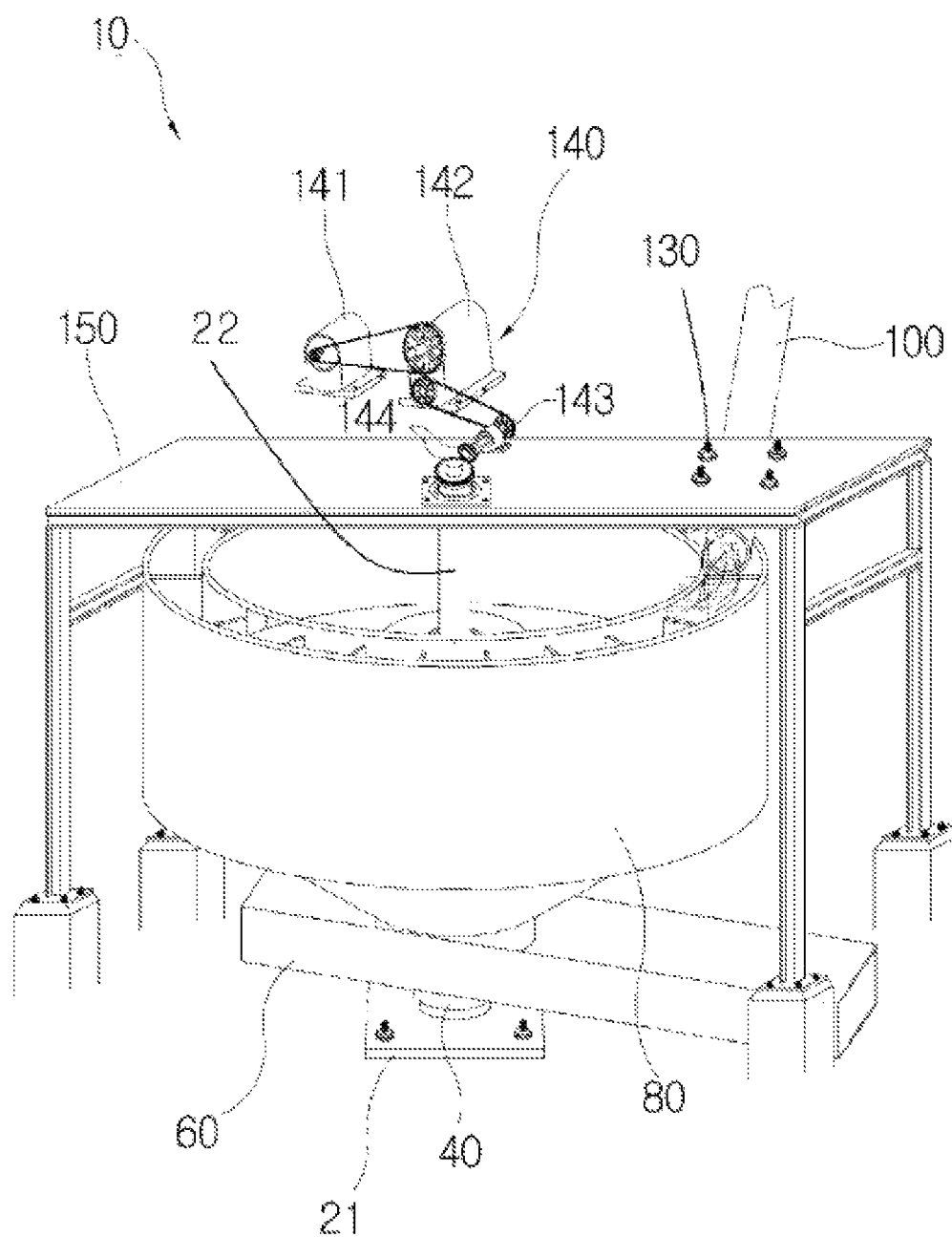
FIGS. 6 and 7 illustrate another exemplary embodiment of the blades of the inventive centripetally acting type water turbine.
Figure 7:
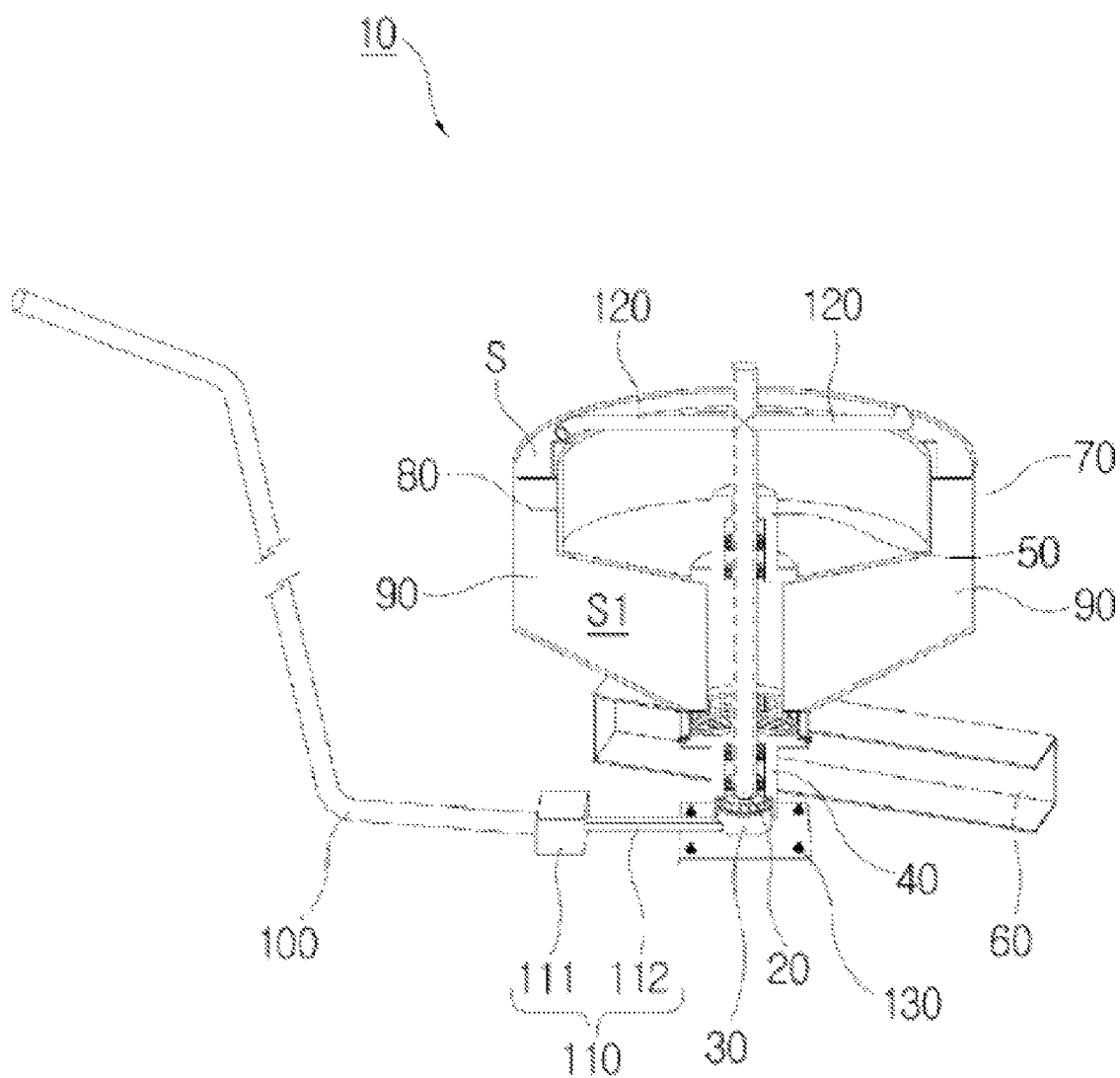

Now, the construction of the present invention will be described with reference to accompanying drawings. FIG. 1 is a half-sectioned perspective view illustrating a rotational force generating device in accordance with an exemplary embodiment of the present invention, FIG. 2 is a front view of the rotational force generating device exemplified in FIG. 1, and FIG. 3 is an exploded perspective view illustrating a centripetally acting type water turbine employing the inventive rotational force generating device. In addition, FIG. 4 is a perspective view illustrating partially in cross-section the internal construction of the inventive centripetally acting type water turbine, FIG. 5 is a top plan view illustrating another exemplary embodiment of the blades of the inventive centripetally acting type water turbine, and FIGS. 6 and 7 illustrate another exemplary embodiment of the blades of the inventive centripetally acting type water turbine.

As illustrated in FIGS. 1 and 2, a rotational force generating device in accordance with an exemplary embodiment of the present invention includes: an inner centripetal canister 80 and an outer centripetal canister 70 that are rotatably supported by means of a stand and a fixed shaft 22 vertically or horizontally on a straight line; and a plurality of blades 90 that are fixedly joined radially between the inner centripetal canister 80 and outer centripetal canister 70. The combined shape of the inner and outer centripetal canisters 80 and 70 and each pair of the adjacent individual blades 90 provides a lower slope which makes water or steam flow downward inclinedly such that the rotational radius of the water or steam is gradually reduced. Accordingly, the inner and outer centripetal canisters 80 and 70 enclosing the blades 90 are rotated using the fixed shaft 22 as a rotation support shaft by the impact of a medium, which includes water or steam, falling from a medium falling mechanism positioned above the rotary frames. Consequently, torques are induced by the lengths of the radius of rotation extending through the top side of the blades 90 and the radius of rotation extending through the bottom side of the blades 90. As a result, the inner and outer centripetal canisters can be made to be continuously rotated due to the difference of torques, which is caused by the variation of the radius of rotation of the medium for power transmission caused by the change of velocity of the medium due to the rotation of the medium and the falling of the medium. As such, the inner and outer centripetal canisters 80 and 70 are made to be rotated.

That is, the rotational moving velocity of the medium at the top outer periphery of the funnel-shaped outer centripetal canister configured as the falling flow space of the medium as described above is relatively reduced as the medium descends to the discharge port side since the circumference is reduced as approaching downward to the discharge port side in the water turbine with the same number of revolution. Due to the difference in energy caused at this time by the difference between the inflow velocity and the outflow velocity of the medium, a power is transmitted to the water turbine. Like this, since the force, which is produced due to the difference in rotational moving velocity in the funnel-shaped outer centripetal canister, is applied to a lateral wall of each of the blades, the rotational power can be produced and maintained.

In addition, the outer centripetal canister 70 and the inner centripetal canister 80 are formed to be higher than the height of the blades 90 to form a space S therebetween, and each of the blades (90) is provided with a protrusion (91) at the top thereof which extends upward into the inside of the space (S).

Furthermore, the rotational force generating device is employed in the inventive centripetally acting type water turbine 10. The centripetally acting type water turbine 10 may include: a fixing unit 20 fixedly mounted at an installation place; a lateral-pressure bearing 30 fitted on a fixed shaft 22 of the fixing unit 20; a lower rotary frame 40 mounted on the lower part of the fixed shaft 22; an upper rotary frame 50 mounted on the fixed shaft 22 to be spaced from the lower rotary frame 40 mounted on the fixed shaft 22; an inner centripetal canister 80 fastened to the outer periphery of an upper cover 81 mounted on the upper rotary frame 50; and a plurality of blades 90 radially mounted between the outer centripetal canister 70 and the inner centripetal canister 80.

The fixing unit 20 is constituted with a fixed plate 21 fixed to an installation place, and a fixed shaft 22 fixedly mounted in the vertical direction on the fixed plate 21.

That is, the fixing unit 20 is fixedly installed on the fixed plate 21 using fastening members 130, such as for example, bolts, nuts, anchor bolts and rivets, and then the fixed shaft 22 is fixed vertically to the top side of the fixed plate 21 by welding or using the fastening members 130.

The lateral-pressure bearing 30 fitted on the lower part of the fixed shaft 22 of the fixing unit 20 is provided so as to allow the lower rotary frame 40 mounted on the top of the lateral-pressure bearing 30 to be smoothly rotated as well as to prevent the lower rotary frame 40 from coming into contact with the fixed plate 21.

The lower rotary frame 40 mounted on the fixed shaft 22 is fastened to the lower part of the fixed shaft 22 to partially enclose the upper part of the lateral-pressure bearing 30. In the inside of the lower rotary frame 40, a plurality of bearings 41 for rotational operation are mounted, and in the upper part of the lower rotary frame 40, a plurality of discharge holes 42 for discharging inflow water to a water drainage channel 60 are formed.

That is, the lower rotary frame 40 is fitted on the fixed shaft 22 to be seated on the upper part of the lateral-pressure bearing 30 such that the lower rotary frame 40 can be rotated through the bearings 41 to transmit the water, which flows into the upper part of the lower rotary frame 40, to the water drainage channel 60 using the discharge holes 42.

At this time, it is efficient that the water drainage channel 60 is inclinedly mounted such that the water supplied to the water drainage channel 60 can be smoothly discharged.

Within the inside of the upper rotary frame 50 mounted on the fixed shaft 22 to be spaced from the lower rotary frame 40 mounted on the fixed shaft 22, bearings 51 for rotational operation are mounted. On the bottom side of the upper rotary frame 50, a horizontal or inclined upper cover 81 is provided to be smoothly coupled with the inner centripetal canister 80.

The outer centripetal canister 70 mounted on the top of the lower rotary frame 40 is formed such that the upper part of the outer centripetal canister 70 has a cylindrical shape, and the lower part of the outer centripetal canister 70 has a funnel shape formed with a slope 71. In addition, the bottom end of the slope 71 is formed with a discharge passage 72 such that the water can be discharged.

That is, the outer centripetal canister 70 is configured to receive water inflowing through the waterway 100 and to discharge the water to the bottom discharge passage 72 through the slope 71 formed by the lower part of the outer centripetal canister 70 such that the water can be discharged.

At this time, the outer centripetal canister 70 is formed to have a height equal to or higher than the height of the inner centripetal canister 80.

The inner centripetal canister 80 coupled to the upper cover 81 mounted on the bottom side of the upper rotary frame 50 is formed in a cylindrical shape. At this time, it shall be noted that the upper cover 81 may be formed in a horizontal plane shape or a funnel shape.

That is, the inner centripetal canister 80 is formed to have a diameter smaller than that of the outer centripetal canister 70 such that a space S is formed between the inner and outer centripetal canisters 80 and 70. Consequently, the water supplied through the waterway 100 is transmitted through the space S.

At this time, it shall be noted that the inner centripetal canister 80 may be formed to have a height to be equal to or lower than that of the outer centripetal canister 70, and may be formed to provide an inclined outer periphery in relation to the space S.

The blades 90 radially mounted between the outer centripetal canister 80 and the inner centripetal canister 70 are arranged such that the top and bottom of the blades 90 are coupled to the bottom side of the upper cover 81 and the slope 71 of the outer centripetal canister 70, respectively.

In addition, each of the blades 90 may be formed in a linear shape, but may be formed in a curved shape when shown in a plan view as illustrated in FIG. 5 such that the blades 90 can minimize the resistance against the water supplied through the waterway 100, and can be smoothly rotated.

Furthermore, it shall be noted that the upper rotary frame 50, the outer centripetal canister 70, the inner centripetal canister 80, the upper cover 81 and the blades 90 may be formed integrally with each other so as to reduce the number of components, to assure the smooth rotational operation, and to minimize load.

The outer centripetal canister 70 and the inner centripetal canister 80 may be formed to have a height higher than that of the blades 90 so as to receive the water supplied through the waterway 100 and smoothly supply the water to the space S1 formed between the adjacent blades 90.

At this time, each of the blades 90 is formed with a protrusion 91 protruding by a predetermined extent into the space S formed between the outer centripetal canister 70 and the inner centripetal canister 80.

The centripetally acting type water turbine 10 may be configured as illustrated in FIG. 6. That is, the fixed shaft 22 is fixedly mounted on the fixed plate 21, and the upper rotary frame 50, the outer centripetal canister 70, the inner centripetal canister 80 and the blades 90 are formed integrally with each other and mounted on the fixed shaft 22 through the bearings 41 and the bearings 51 to be rotatable. Above the fixed shaft 22, there may be provided a power transmission mechanism 140 such that the upper rotary frame 50 extends to be rotatably coupled with the power transmission mechanism 140 to be rotationally operated by the power transmission mechanism 140.

Here, the power transmission mechanism 140 includes: an electric generator 141; a gear box 142 that is constituted with a plurality of gears and linked to the electric generator 141 through a belt or chain such that a rotational power is transmitted to the electric generator 141; a rotary shaft 143 that cooperates with the gear box 142 via the belt or chain; and bevel gears 144 mounted on the rotary shaft 143 and the extension shaft of the upper rotary frame 50 respectively to be rotationally operated.

More specifically, in a construction in which a support shaft extending from the upper rotary frame 50 of the centripetally acting type water turbine 10 through a table 150 is rotatably coupled to the fixed shaft 22 fixed to the fixed plate 21, the rotational force generating device further includes a power transmission mechanism 140, in which the power transmission mechanism 140 is provided with a rotary shaft 143 operated through a bevel gear 144, a gear box 142 linked to the rotary shaft 143 through a belt or a chain, and an electric generator 141 configured to receive power from the gear box 142 to produce electric energy.

At this time, the waterway 100 may be efficiently fixed by providing a table 150 in the outside of the centripetally acting type water turbine 10, and fastening the waterway 100 to the table 150 using the fastening members 130, such as U-shaped bolts and nuts.

Next, another exemplary embodiment of the inventive centripetally acting type water turbine illustrated in FIG. 7 will be briefly described.

The water turbine 10 is a centripetally acting type water turbine configured to be rotationally operated by using water supplied from a waterway 100. The water turbine 10 includes: a hollow fixing unit 20 in which a fixed shaft 22 is fixedly vertically to a fixed plate 21 fixed to an installation place; a lateral-pressure bearing 30 that is fitted on the lower part of the fixed shaft 22 of the fixing unit 20; a lower rotary frame 40 that is mounted on the lower part of the fixed shaft 22 to partially enclose the upper part of the lateral-pressure bearing 30, the lower rotary frame 40 being provided with one or more bearings 41 for rotational operation within the inside thereof, and being formed with a plurality of discharge holes 42 in the top side thereof at a predetermined interval to be capable of discharging inflow water to a water drainage channel 60; an upper rotary frame 50 that is mounted on the upper part of the fixed shaft 22 to be spaced from the lower rotary frame 40, the upper rotary frame 50 being provided with a plurality of bearings 51 for rotational operation; a cylindrical external centripetal canister 70 that is mounted on the lower rotary frame 40, the lower part of the external centripetal canister 70 being formed with a slope 71 such that water can easily flow into the bottom rotary frame 40, and a plurality of discharge passages 72 being formed around the lower end; a cylindrical internal centripetal canister 80 with an upper cover 81 mounted on the bottom side of the upper rotary frame 50; a plurality of blades 90 that are mounted radially between the outer centripetal canister 70 and inner centripetal canisters 80; a water supply unit 110 that is configured to regulate, through a connection passage 111, the water supplied from the waterway 100, and then to supply the water, which is transmitted to the connection passage 111, to the inside of the fixed shaft 22 through a communication tubing 112 connected to the fixed shaft 22; and one or more branch pipes 120 that are mounted on the upper part of the fixed shaft 22 and configured to supply the water, which is transmitted thereto through the fixed shaft 22, to a space S formed between the outer centripetal canister 70 and the inner centripetal canister 80.

That is, the centripetally acting type water turbine 10 is configured such that the fixed shaft 22 of the fixing unit 20 is formed in a hollow shape, and the water supply unit 110 and the branch pipes 120 are mounted on the bottom and top of the fixed shaft 22, respectively, so as to rotationally operate the centripetally acting type water turbine 10.

Next, the exemplary embodiment of the centripetally acting type water turbine configured as described above will be described.

At first, the fixed plate 21 is fixedly mounted at an installation place using the fastening members 130, and then the fixed shaft 22 is fixedly mounted on the fixed plate 21 vertically, thereby constituting the fixing unit 20. Thereafter, the lateral-pressure bearing 30 is fitted on the lower part of the fixed shaft 22 constituting the fixing unit 20.

Then, the lower rotary frame 40 is mounted on the lower part of the fixed shaft 22 to partially enclose the upper part of the lateral-pressure bearing 30. In the inside of the lower rotary frame 40, the bearings 41 for rotational operation are mounted, and the discharge holes 42 are formed in the upper part of the lower rotary frame 40 at a regular interval such that the inflow water can be discharged to the water drainage channel 60.

At this time, the water drainage channel 60 is mounted to be inclined such that the water transmitted through the discharge holes 42 can be smoothly discharged to the outside.

Next, the discharge holes 42 are formed in the upper part of the lower rotary frame 40 such that water can be readily discharged to the outside of the lower rotary frame 40, then the cylindrical outer centripetal canister 70, which is formed with a slope 71 at the bottom thereof, is mounted, and then the blades 90 are radially mounted in the outer centripetal canister 70 in such a manner that the blades 90 are spaced from each other.

Then, the cylindrical inner centripetal canister 80 coupled with the upper cover 81 is mounted above the blades 90, and then the upper rotary frame 50 is mounted in the inside of the inner centripetal canister 80 from the top side of the inner centripetal canister 80, in which the bearings 51 for rotational operation are mounted in the upper rotary frame 50.

At this time, the inner centripetal canister 80 is formed to have a diameter smaller than that of the outer centripetal canister 70.

Next, the waterway 100 is mounted at a side of the inner centripetal canister 80 and the outer centripetal canister 70 such that water can be supplied to the spaces between the blades 90. As such, the assembly of the centripetally acting type water turbine 10 is completed.

Here, it shall be noted that the sequence of assembly of the centripetally acting type water turbine may be different from that described above.

Next, the operating conditions of the centripetally acting type water turbine 10 will be discussed.

At first, water is supplied to the space S formed between the outer centripetal canister 70 and the inner centripetal canister 80 through the waterway 100.

Then, the water flowing through the space S is received in the spaces S1 formed between each pair of the adjacent blades 90, thereby rotating the blades 90 in the direction of progress of the water.

That is, the hydraulic pressure of the water supplied to the waterway 100 acts on the blades 90, thereby rotating the blades 90.

Next, the water falling down after impacting the blades 90 moves downward along the slope 71 formed in the lower part of the outer centripetal canister 70, and hence rotates with a gradually reduced radius of rotation. Then, the water escaping the slope 71 is transmitted to the water drainage channel 60, and then discharged to the outside through the water drainage channel 60.

The water supplied through the waterway 100 as described above is capable of continuously rotating the blades 90, the outer centripetal canister 70 and the inner centripetal canister 80 by using the hydraulic pressure and rotational inertial thereof.

Although the inventive centripetally acting type water turbine has been described with reference to the accompanying drawings mainly with specific shapes and directions, it will be appreciated by a person having an ordinary skill in the art that various modifications and changes can be made from the present invention. Therefore, such modifications and changes shall be construed as falling within the scope of the present invention.

The invention claimed is:

1. A centripetally acting type water turbine configured to be rotationally operated by water supplied from a waterway, the water turbine comprising:
   a fixed shaft vertically fixed to a fixed plate; an upper rotary frame mounted on the upper part of the fixed shaft in a state in which one or more bearings are provided within the upper rotary frame, an upper cover being mounted on the bottom side of the upper rotary frame;
   a lower rotary frame mounted on the lower part of the fixed shaft, the lower rotary frame being provided with one or more bearings for rotational operation within the inside thereof, and being formed with a plurality of discharge holes in the top side thereof at a predetermined interval to be capable of discharging inflow water to a water drainage channel;
   an outer centripetal canister mounted on the top of the lower rotary frame, the upper part of the outer centripetal canister having a cylindrical shape, and the lower part of the outer centripetal canister having a funnel shape formed with a slope;
   a cylindrical inner centripetal canister installed on the upper cover of the upper rotary frame; and a plurality of blades radially mounted between the outer centripetal canister and the inner centripetal canister.

2. The centripetally acting type water turbine as claimed in claim 1, wherein the outer centripetal canister and the inner centripetal canister are formed to be higher than the height of the blades to form a space there between, and each of the blades is provided with a protrusion at the top thereof which extends upward into the inside of the space.

3. The centripetally acting type water turbine as claimed in claim 1, wherein the upper rotary frame, the outer centripetal canister, the inner centripetal canister and the blades are formed integrally with each other.

4. The centripetally acting type water turbine as claimed in claim 1, wherein each of the blades is formed to be curved in a streamline shape when shown in a top plan view.

5. The centripetally acting type water turbine as claimed in claim 1, further comprising:
   a power transmitter connected to a top end of an extension shaft extending from the upper rotary frame so as to transmit a power generated by rotation of the extension shaft, the power transmitter transmitting the power using at least one of bevel gear, belt and chain; and
   an electric generator configured to receive the power from the power transmitter to generate electricity.

6. The centripetally acting type water turbine as claimed in claim 1, further comprising: one or more branch pipes configured to supply water to the space between the outer centripetal canister and the inner centripetal canister.

7. The centripetally acting type water turbine as claimed in claim 1, wherein the outer centripetal canister, the inner centripetal canister and each pair of adjacent blades are inclined such that the radius of rotation of water or steam is gradually reduced as approaching to the lower ends thereof while flowing in the inclined direction.

8. A centripetally acting type water turbine configured to be rotationally operated by using water supplied from a waterway, the water turbine comprising:
   a hollow fixing unit in which a fixed shaft is vertically fixed to a fixed plate fixed to an installation place;
   a lateral-pressure bearing that is fitted on the lower part of the fixed shaft of the fixing unit;
   a lower rotary frame that is mounted on the lower part of the fixed shaft to partially enclose the upper part of the lateral-pressure bearing, the lower rotary frame being provided with one or more bearings) for rotational operation within the inside thereof, and being formed with a plurality of discharge holes in the top side thereof at a predetermined interval to be capable of discharging inflow water to a water drainage channel;
   an upper rotary frame that is mounted on the upper part of the fixed shaft to be spaced from the lower rotary frame, the upper rotary frame being provided with a plurality of bearings for rotational operation;
   a cylindrical external centripetal canister that is mounted on the lower rotary frame, the lower part of the external centripetal canister being formed with a slope such that water can easily flow into the bottom rotary frame, and a plurality of discharge passages being formed around the lower end; a cylindrical internal centripetal canister with an upper cover mounted on the bottom side of the upper rotary frame;
   a plurality of blades that are mounted radially between the external centripetal canister and internal centripetal canisters; a water supply unit that is configured to regulate, through a connection passage, the water supplied from the waterway, and then to supply the water, which is transmitted to the connection passage, to the inside of the fixed shaft through a communication tubing connected to the fixed shaft; and
   one or more branch pipes that are mounted on the upper part of the fixed shaft and configured to supply the water, which is transmitted thereto through the fixed shaft, to a space formed between the external centripetal canister and the internal centripetal canister.

\* \* \* \* \*